(12) United States Patent
Olds et al.

(10) Patent No.: US 8,463,984 B2
(45) Date of Patent: Jun. 11, 2013

(54) DYNAMIC DATA FLOW MANAGEMENT IN A MULTIPLE CACHE ARCHITECTURE

(75) Inventors: Edwin Scott Olds, Fort Collins, CO (US); Timothy Richard Feldman, Louisville, CO (US); David Warren Wheelock, Longmont, CO (US); Steven Scott William, Longmont, CO (US); Robert William Dixon, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 511 days.

(21) Appl. No.: 12/650,657

(22) Filed: Dec. 31, 2009

(65) Prior Publication Data

US 2011/0161555 A1   Jun. 30, 2011

(51) Int. Cl.
*G06F 12/00* (2006.01)
(52) U.S. Cl.
USPC .......................................... 711/103; 711/158
(58) Field of Classification Search
None
See application file for complete search history.

(56) References Cited

U.S. PATENT DOCUMENTS

| | | | |
|---|---|---|---|
| 5,778,418 A | 7/1998 | Auclair et al. | |
| 5,860,083 A | 1/1999 | Sukegawa | |
| 6,016,530 A | 1/2000 | Auclair et al. | |
| 6,463,509 B1 | 10/2002 | Teoman et al. | |
| 6,937,411 B2 | 8/2005 | Goodman et al. | |
| 7,127,549 B2 | 10/2006 | Sinclair | |
| 7,136,973 B2 | 11/2006 | Sinclair | |
| 2007/0213005 A1* | 9/2007 | Hsiao | 455/11.1 |
| 2008/0086600 A1* | 4/2008 | Qiao | 711/133 |

* cited by examiner

*Primary Examiner* — Edward Dudek, Jr.
*Assistant Examiner* — John P Fishburn
(74) *Attorney, Agent, or Firm* — Cesari & Reed, LLP; Kirk A. Cesari

(57) ABSTRACT

The disclosure is related to systems and methods of dynamic dataflow in a multiple cache architecture. In an embodiment, a system having a data storage device with a multiple cache architecture may detect at least one attribute affecting a data storage workload or data storage performance. The system may select at least one of a plurality of data flow schemes based on the at least one attribute, which may be done to optimize the data storage workload for various conditions. In another embodiment, a data storage controller may automatically and dynamically select one of multiple data flow schemes within a data storage device having a multiple cache architecture. The data storage controller may monitor attributes to determine which data flow scheme to select for various workloads of the data storage device.

15 Claims, 6 Drawing Sheets

DYNAMIC DATA FLOW MANAGEMENT IN A MULTIPLE CACHE ARCHITECTURE

BACKGROUND

There are potentially a wide variety of workloads given to a data storage device. Some data storage devices have performance optimizations for a specific workload. However, the performance optimization may not be optimal when a different workload occurs. Therefore, improved methods and devices for management of a data storage device are needed.

SUMMARY

In an embodiment, a system having a data storage device with a multiple cache architecture may detect at least one attribute affecting a data storage workload or data storage performance. The system may select at least one of a plurality of data flow schemes based on the at least one attribute, which may be done to optimize the data storage workload for various conditions. In another embodiment, a data storage controller may automatically and dynamically select one of multiple data flow schemes within a data storage device having a multiple cache architecture. The data storage controller may monitor attributes to determine which data flow scheme to select for various workloads of the data storage device.

In another embodiment, a method comprises detecting at least one attribute of a system having a data storage device with at least two memories of different types and selecting at least one of a plurality of data flow schemes based on the at least one attribute. A data flow scheme may determine an order of priority of storing the data in the at least two memories. The method may also include implementing the at least one of a plurality of data flow schemes within the data storage device.

Another embodiment may include a device comprising a first memory and a second memory that is a different type of memory than the first memory. The device may also include logic coupled to the first memory and the second memory and configured to detect at least one attribute related to the device, select at least one of a plurality of data flow schemes based on the at least one attribute, and implement the at least one of a plurality of data flow schemes. A data flow scheme can determine an order of priority of storing the data in the first memory and the second memory.

In yet another embodiment, a computer readable medium having instructions to cause a processor to execute a method may comprise detecting at least one attribute of a system having a data storage device with at least two memories of different types, selecting at least one of a plurality of data flow schemes based on the at least one attribute, and implementing the at least one of a plurality of data flow schemes within the data storage device.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
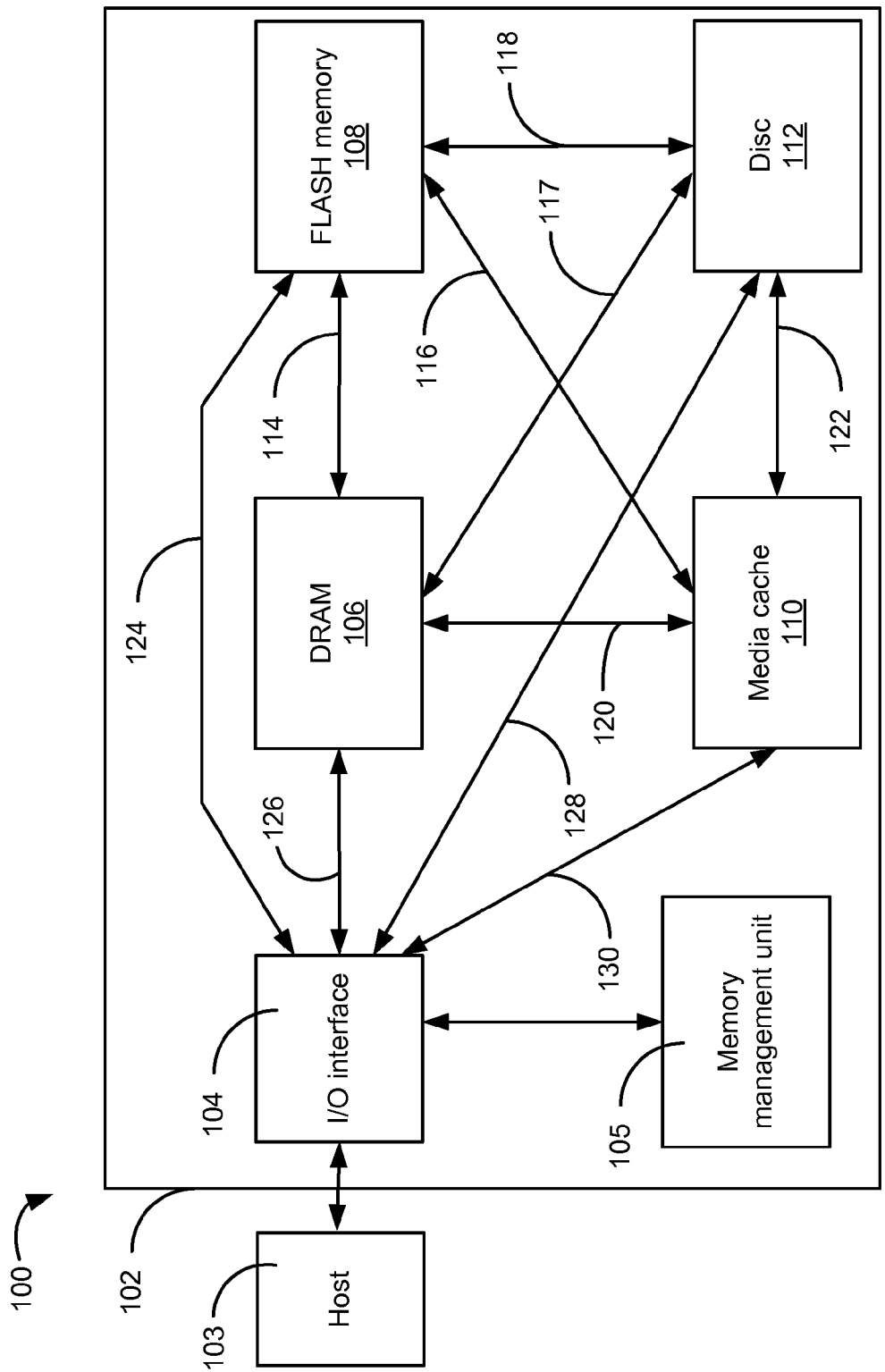
FIG. 1 is a diagram of an embodiment of a system having dynamic data flow management in an architecture with multiple caches.

Referring to FIG. 1, a particular embodiment of a system of dynamic dataflow management in a multiple cache architecture is depicted and generally designated 100. The system 100 includes a data storage device 102 that can be operably coupled to a host 103 via an input/output (I/O) interface 104. The data storage device 102 can include multiple levels of cache, such as volatile cache and non-volatile cache, as well as a non-volatile main data store. The multiple levels of cache may be any combination of types of memory and may include a volatile cache such as dynamic random access memory (DRAM) 106, a non-volatile solid state cache such as Flash memory 108, a media cache 110, and a main data store such as magnetic disc 112.

The media cache 110 may be a reserved space on a data storage medium that is, like a typical cache, not statically mapped to user logical block addresses (LBAs). The media cache can have a relatively large capacity with a specific attributes such as long latency by high throughput and may be used when a large amount of data associated with a write operation has to be stored quickly, such as when audio or video data is streamed from the host 103. In a particular embodiment, the media cache 110 may be located on a reserved area of the magnetic disc 112.

The data storage device 102 may also include a memory management unit 105, such as a controller having a processor and memory in addition to other circuits and logic to perform the functions described herein. The memory management unit 105 can control selection of data flow between the host 103 and the multiple levels of cache in the data storage device 102. The memory management unit 105 may also dynamically change the order of the caches (i.e. change the levels of the caches on-the-fly) and dynamically change the data flow between one level of cache and another level of cache in the data storage device 102.

During operation, the memory management unit 105 may implement a memory management algorithm to select one of multiple data flow schemes that specify a particular data path to transfer data from one data storage medium to another. The memory management algorithm may be implemented using software, logic, a circuit, or any combination thereof. The memory management algorithm may detect various attributes, such as a type of data being received from the host 103 or a type of host system, and select a particular data flow scheme based on the detected attribute, which may be performed in real-time during use of the system 100.

Many different data flow schemes may be possible. For example, one of the data flow schemes may include transferring data from the I/O interface 104 to the flash memory 108 through the DRAM 106 via data path 126 and data path 114. Another one of the data flow schemes may include transferring data from the I/O interface 104 to the magnetic disc 112 through the DRAM 106 via data path 126 and data path 117. Another one of the data flow schemes may include transferring data from the I/O interface 104 to the media cache 110 through the DRAM 106 via data path 126 and data path 120. Further, another one of the data flow schemes may include transferring data from the I/O interface 104 directly to the flash memory 108 via data path 124. Another one of the data flow schemes may include transferring data from the I/O interface 104 directly to the media cache 110 via data path 130. Another one of the data flow schemes may include transferring data from the I/O interface 104 directly to the magnetic disc 112 via data path 128. Even further, another one of the data flow schemes may include transferring data from the media cache 110 directly to the DRAM 106 via data path 120. Another one of the data flow schemes may include transferring data from the media cache 110 directly to the flash memory 108 via data path 116. Another one of the data flow schemes may include transferring data from the media cache 110 directly to the magnetic disc 112 via data path 122. Another one of the data flow schemes may include transferring data from the flash memory 108 directly to the DRAM 106 via data path 114. Another one of the data flow schemes may include transferring data from the flash memory 108 directly to the media cache 110 via data path 116. Another one of the data flow schemes may include transferring data from the flash memory 108 directly to the magnetic disc 112 via data path 118. Also, another one of the data flow schemes may include transferring data from the magnetic disc 112 directly to the DRAM 106 via data path 117. Another one of the data flow schemes may include transferring data from the magnetic disc 112 directly to the media cache 110 via data path 122. Another one of the data flow schemes may include transferring data from the magnetic disc 112 directly to the flash memory 108 via data path 118.

The memory management algorithm may implement any combination of the data flow schemes and may dynamically (i.e. on-the-fly during use of the device) select combinations of data storage mediums and data paths to be used based on attributes of the system 100. The attributes may include capacities of the data storage mediums, speeds of the data storage mediums, a type of the host 103, functionality of the host 103, a type of data the host 103 is sending or receiving, an indicator of importance of the data, a user selection, or any combination thereof. For example, a particular data flow scheme may include transferring data from the media cache 110 to the flash memory 108 via the data path 116, then transferring the data from the flash memory 108 to the magnetic disc 112 via the data path 118. In another example, the media cache 110 may receive data from the I/O interface 104 via the data path 130. The data may then be transferred to the magnetic disc 112 via the data path 122.

Further, the system 100 may detect the attributes of the system 100 and provide information based on the detected attribute to the memory management unit 105. The detection may be performed at the host 103 or at the data storage device 102. In addition to the attributes described above, the attributes may comprise host attributes, data attributes, data storage device attributes, physical settings (such as a switch), or any combination thereof. In a particular embodiment, the attribute may include an indication of a data throughput requirement of the host 103. In still another particular embodiment, the attribute may be an amount of available (unused) memory in one or more of the memory devices within the data storage device 102.

Particular data flow schemes may be selected based on particular uses of the system 100 and may be designed to provide a specific benefit to the system 100, such as power savings or increased data throughput. For example, in a scenario where power savings may be a concern, the memory management unit 105 may receive an indicator to implement a power saving data flow scheme, which may include transferring data from the I/O interface 104 to the DRAM 106, or directly to the flash memory 108, while reducing power to the magnetic disc 112. In another example, the memory management unit 105 may receive an indicator to implement an increased data throughput data flow scheme, which may include transferring data directly from the I/O interface 104 to the media cache 110.

In another example, the host 103 may determine, via an operating system or other means, a type of data to be transferred to or received from the data storage device 102. The host 103 may then notify the data storage device 102 of the type of data and the data storage device 102 may then determine which data flow scheme to implement based at least partially on the type of data. Any attribute of the host 103, such as type of program to be executed, environmental conditions, available power, length of time between data storage accesses, or any other operating parameter may be sent to the data storage device 102 and the memory management unit 105 may use such information, in any combination, to determine which data flow scheme to implement.

In a particular embodiment, the data storage device 100 may implement at least three different data flow schemes. The memory management unit 105 may select a first data flow scheme to move frequently accessed logical block addresses (LBAs) from a non-volatile first memory, such as the flash memory 108, to a volatile second memory, such as the DRAM 106, when an indication is received that certain data is to be frequently written. Selecting the first data flow scheme may include detecting frequently accessed LBAs in the first memory and comparing the frequency of access to a threshold. If the frequency of access is greater than the threshold, the memory management unit 105 may implement the first data flow scheme. The first data flow scheme may allow for the wear on the first memory to be reduced.

The data storage device 102 may implement a second data flow scheme when a scenario occurs for which enhanced reliability may be beneficial. The second data flow scheme may include moving system data from a volatile first memory, such as the DRAM 106, to a nonvolatile second memory, such as flash memory 108. The system data may include tables that track writes to areas the storage mediums, defect description tables, or other system data for which increased reliability may be beneficial. The data storage device 102 may determine that the system 100 may need increased data reliability based on attributes related to a need for increased reliability, such as a type of data and an importance of the data to be accurate. For example, the data storage device 102 may store tables that track writes to designated regions of a storage medium to the flash memory 108. The data storage device 102 may then monitor the tables to determine when writes to a specific region exceed a threshold. The data storage device 102 may then perform a maintenance operation to identify potential errors and decrease the effects of any errors.

A third data flow scheme may be implemented by the data storage device 102 that includes an algorithm to designate multiple memories as write cache. For example, the DRAM 106, the flash memory 108, the media cache 110, or any combination thereof, may be designated as write cache. The third data flow scheme may be implemented when a scenario is detected for which an increased amount of write cache may be beneficial, such as when the system 100 may need an increased data throughput from the host 103 to the data storage device 102. For example, when the system 100 is implemented in a digital video recorder (DVR), the system 100 may need an increased data throughput. Thus, a data flow scheme to increase data throughput may be implemented, such as streaming data directly from the I/O interface 104 to the media cache 110 when recording a program or streaming directly from the magnetic disc 112 to the I/O interface 104 when sending a program to the host. In a particular embodiment, attributes that may be included in a scenario for a DVR may include an amount of data throughput, a type of data, and an importance of the data to be accurate. Non-critical data, such as audio data or video data, may not need to be as accurately processed, that is without errors in the reading or writing of the data, compared to critical data, such as system boot files.

Figure 2:
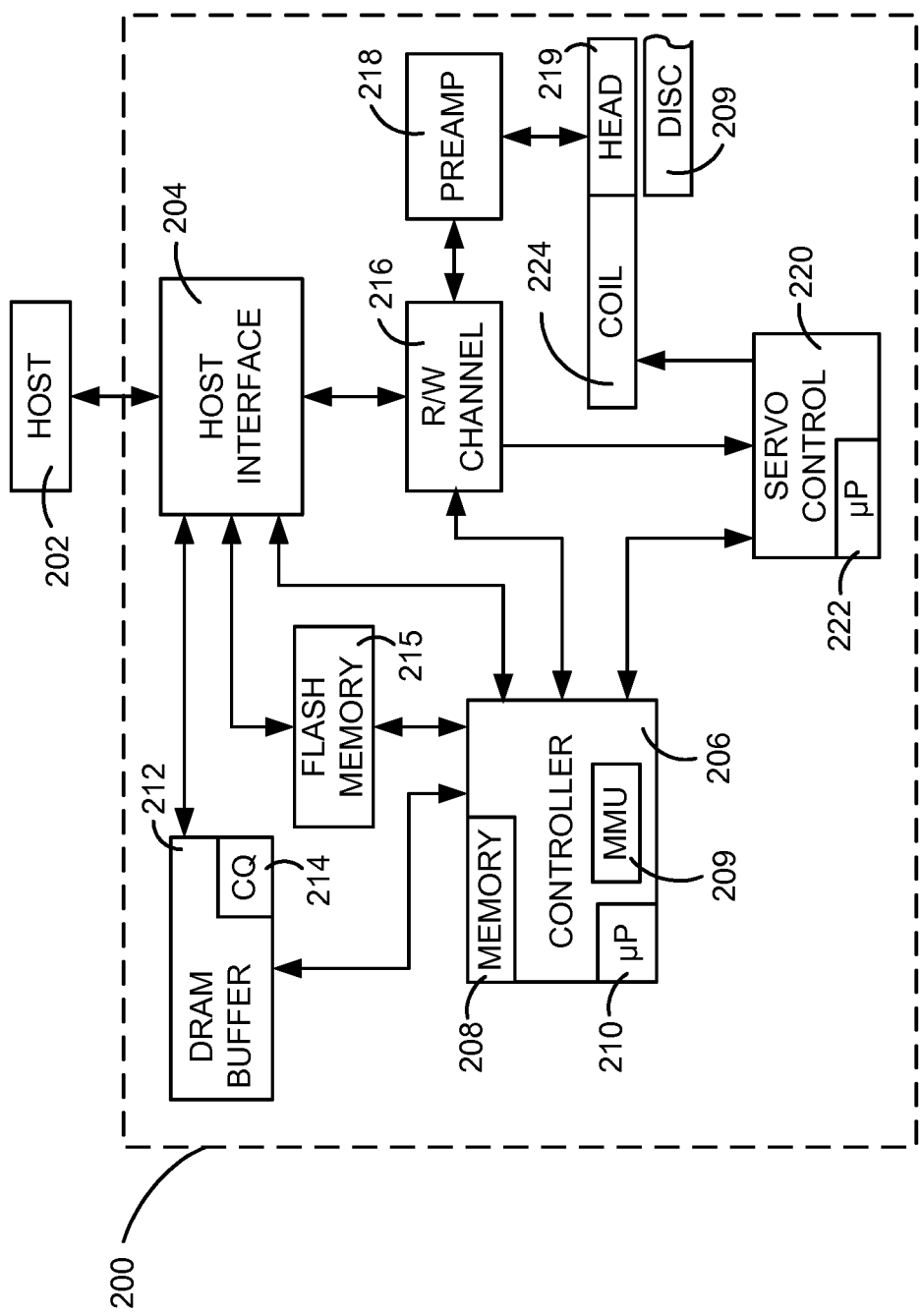
FIG. 2 is a diagram of another embodiment of a system having dynamic data flow management in an architecture with multiple caches.

Referring to FIG. 2, a functional block diagram of a system of dynamic dataflow management in a multiple cache architecture is depicted as a data storage device 200. The data storage device 200 includes an interface circuit 204 that can be operably coupled with a host device 202, such as a computer, digital video recorder, telephone, music player, or camera, to communicate commands and data. The data storage device 200 also includes a programmable controller 206 having associated memory 208, processor 210, and memory management unit 209. The programmable controller 206 may be coupled to a buffer 212, which may be a DRAM device, that can temporarily store user data during read and write operations, and may include a command queue (CQ) 214 where multiple pending access operations can be temporarily stored pending execution. The data storage device 200 may also include a solid state non-volatile memory device, which may be a flash memory device 215.

The data storage device 200 may also include a read/write (R/W) channel 216 which can encode data during write operations and reconstruct user data retrieved from the disc(s) 209 during read operations. A preamplifier/driver circuit (preamp) 218 can apply write currents to the head(s) 219 and provide pre-amplification of readback signals. A servo control circuit 220 can use servo data to provide the appropriate current to a coil 224 to position the head(s) 219 for reading and writing. The controller 206 can communicate with a processor 222 to move the head(s) 219 to the desired locations while the disc(s) 209 are rotating during execution of the various pending commands in the command queue 214.

The data storage device 200 may also include a media cache (not shown). The media cache can be a reserved space on the disc 209, or any other data storage medium, that is not mapped to user logical block addresses (LBAs). In a particular embodiment, data can be streamed from the host 202 directly to the media cache via the host interface 204 without having to be stored in the buffer 212 or the flash memory 215.

During operation, the memory management unit 209 may implement a memory management algorithm to select one of multiple data flow schemes. The data flow schemes may specify a particular data flow between the host 202 and the data storage mediums (i.e. the buffer 212, the flash memory 215, and/or the disc 209) or from one of the data storage mediums to another of the data storage mediums. A data flow scheme may be chosen based on attributes of the data storage device 200 or the host 202, such as capacities of the data storage mediums, speed of the data storage mediums, a type of the host, functionality of the host, a type of data the host is sending or receiving, an indicator of importance of the data, or any combination thereof. For example, a particular data flow scheme may include a data flow that transfers data from the host interface 204 directly to the flash memory 215. Another particular data flow scheme may include a data flow that transfers data from the host interface 204 to the media cache and then to an addressable location on the disc 209. The data flow scheme may be determined and selected in real-time.

Allowing the data storage device 200 to determine a data flow based on various scenarios can allow for improved usage of the different types of data storage mediums in the data storage device 200. The improved usage can lead to improved system level performance, improved system level reliability, and reduced power consumption.

Figure 3:
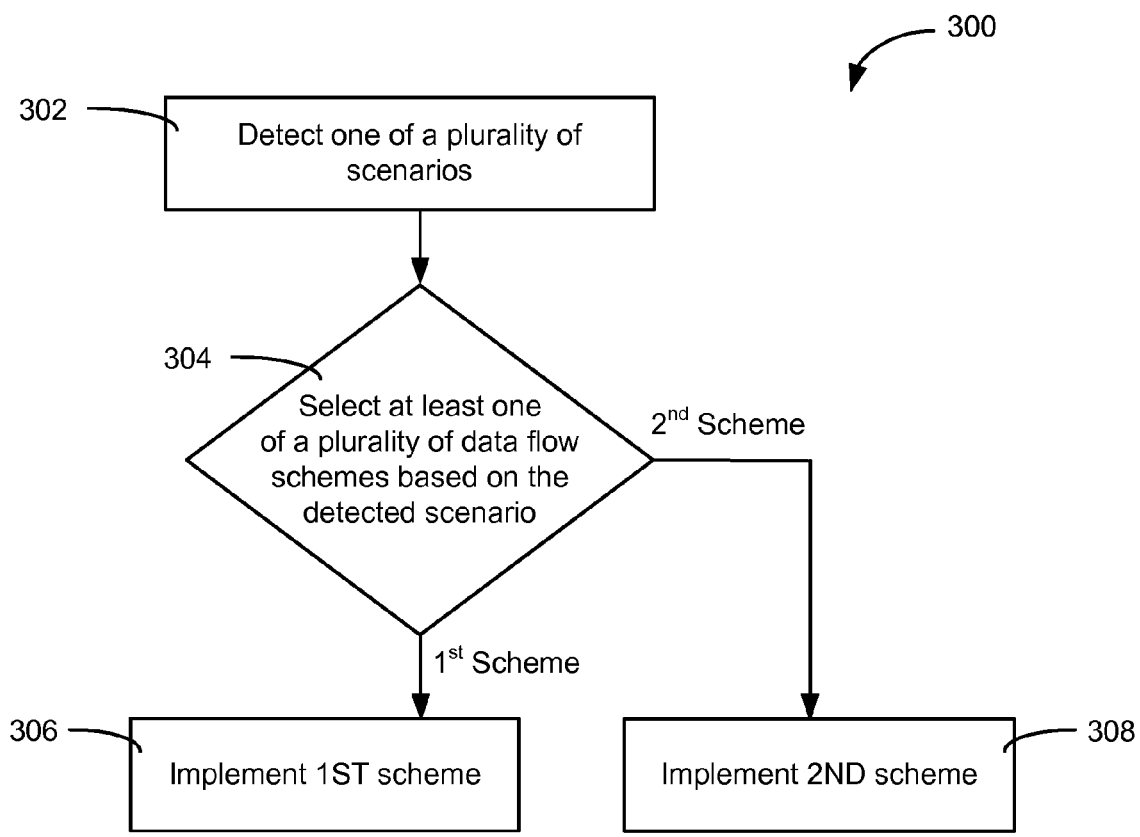
FIG. 3 is a flow diagram of an embodiment of a method of dynamic data flow management in an architecture with multiple caches.

Referring to FIG. 3, a flow diagram of an embodiment of a method dynamic dataflow management in a multiple cache architecture is depicted and generally designated 300. The method 300 may be performed by a data storage device, a host, or a system including a data storage device and a host. In a particular embodiment, the data storage device may perform the method 300 in real-time during use of the data storage device.

The method 300 may include detecting one of a plurality of scenarios, at 302, which may be based on particular applications/uses of the system and may be designed to provide a specific benefit to the system, such as more power savings or faster data throughput compared to another particular scenario. A scenario may be a host attribute, a data attribute, a data storage device attribute, a physical setting such as a switch, or any combination thereof. In a particular embodiment, the scenario may be a type of data being received by a data storage device from a host, a type of host system, a data throughput requirement of a host device, an indicator of importance of data to be received or transferred, an amount of available memory in one or more data storage mediums, or any combination thereof. Detecting the scenarios may be performed by a data storage device having a multiple cache architecture, such as data storage device 102 shown in FIG. 1, or at a host device, such as host 103 shown in FIG. 1. In a particular embodiment, the host and/or the data storage device may be pre-programmed to detect multiple scenarios.

For example, the host device may determine, via an operating system or other means, a type of data to be transferred to or received from the data storage device. The host may then notify the data storage device of the type of data and the data storage device may then choose the scenario based on the type of data. Additionally, any attribute of the host, such as type of program to be executed, environmental conditions, available power, length of time between data storage accesses, or any other operating parameter may be sent to the data storage device and the data storage device may use such information to select one of a plurality of scenarios. Further, multiple attributes may be used to detect a scenario. For example, a scenario may be selected based on a type of data and a frequency with which the data may be accessed.

The method 300 may also include selecting one of a plurality of data flow schemes for a multiple level cache data storage device based on the detected scenario, at 304. The data storage schemes may include instructions and logic to manage data flow within the multiple level cache data storage device. Each of the plurality of data storage schemes may have a unique data flow between the multiple levels of cache and/or between the host and at least one level of cache. The selecting can be performed during a manufacturing process of the data storage device, a manufacturing process of the host device, by a user or a recipient of another manufacturer of the data storage device after the manufacturing process, or in real-time by the host or the data storage device during use of the system.

When a first data flow scheme is selected, the method 300 may also include implementing the first data flow scheme, at 306. In a particular embodiment, the first data flow scheme may include implementing an algorithm to move frequently accessed logical block addresses (LBAs) from a first memory, such as the flash memory 108 shown in FIG. 1, to a second memory, such as the DRAM 106 shown in FIG. 1. The first data flow scheme may be implemented when a scenario occurs that is associated with repeated accesses to specific LBAs in the first memory. Detecting the scenario may include detecting frequently accessed LBAs in the first memory and comparing the frequency of access to a threshold. Thus, the first data flow scheme may allow for the wear on the first memory to be reduced.

When a second data flow scheme is selected, the method 300 may also include implementing the second data flow scheme, at 308. In a particular embodiment, the second data scheme may include implementing an algorithm to move system data from a first memory, such as the DRAM 106 shown in FIG. 1, to a second memory that is non-volatile, such as flash memory 108 shown in FIG. 1. The system data may include tables that track writes to designated areas of a storage medium, such as the magnetic disc 112 shown in FIG. 1. The system data may also include other system data such as defect description tables or other system data for which increased reliability may be beneficial. The second data flow scheme may be implemented when a scenario occurs for which enhanced reliability may be beneficial.

In another particular embodiment, a third data flow scheme may include implementing an algorithm to designate multiple memories as write cache. For example, a first memory, such as DRAM 106 shown in FIG. 1, a second memory, such as flash memory 108 shown in FIG. 1, and a third memory, such as media cache 110 shown in FIG. 1, may be designated as write cache. The third data flow scheme may be implemented when a scenario occurs for which an increased amount of write cache may be beneficial.

Figure 4:
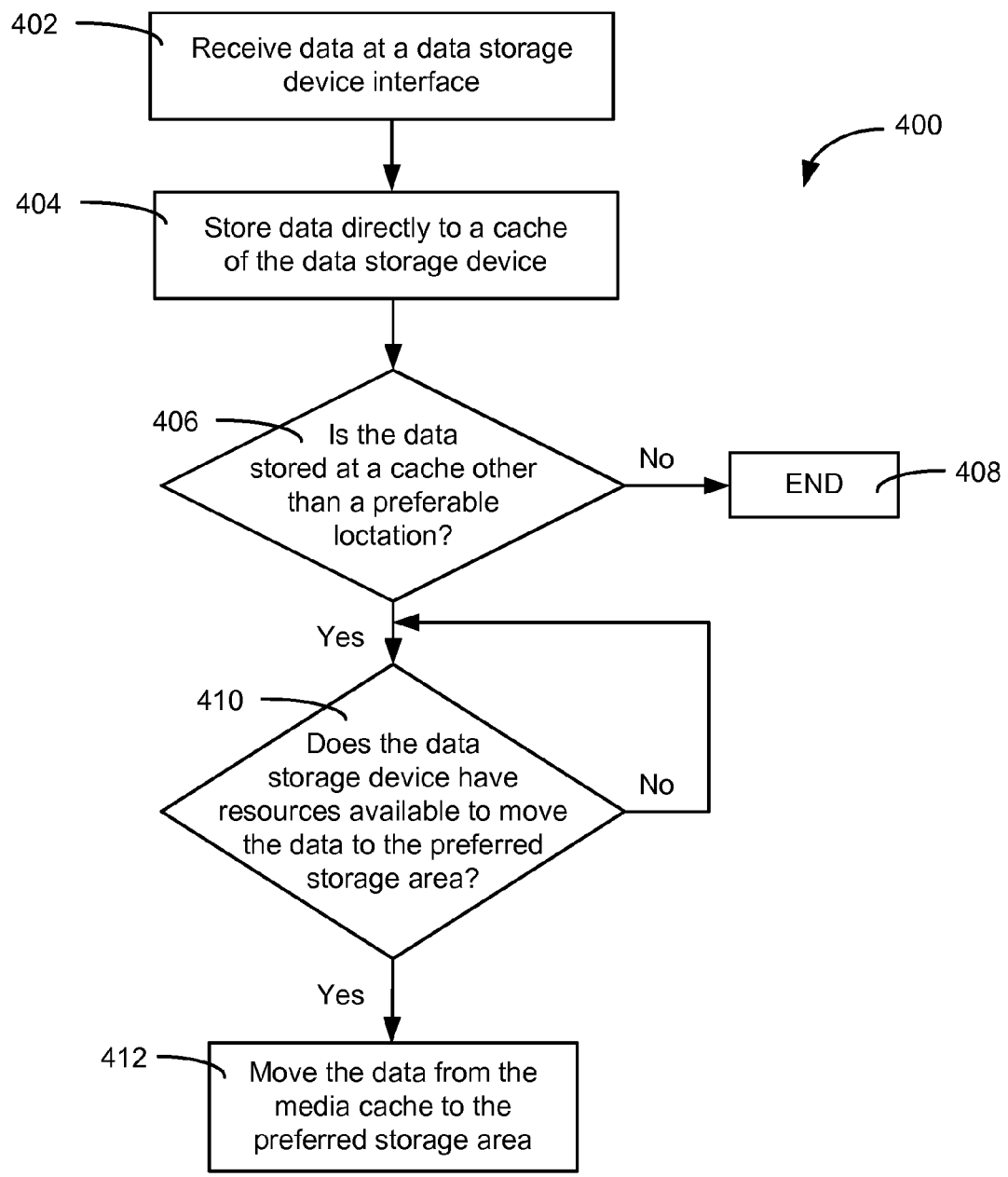
FIG. 4 is a flow diagram of another embodiment of a method of dynamic data flow management in an architecture with multiple caches.

Referring to FIG. 4, a flow diagram of another embodiment of a method of dynamic dataflow management in a multiple cache architecture is depicted and generally designated 400. The method 400 may be performed by a data storage device, such as the data storage device 100 shown in FIG. 1, in real-time. In a particular embodiment, the method 400 may be implemented by a controller of the data storage device when a relatively fast throughput for storage is needed. This may occur in a situation when host data is intended for a nonvolatile solid state data storage device, such as flash memory, yet the rate at which the nonvolatile solid state data storage device can store the data is too slow. Thus, the controller may implement the method 400 to increase data storage speed. The data storage device may detect when to implement the method 400 based on attributes of the data storage device or the host, such as a fill rate of write cache or an indicator received from the host.

Data may be received at the data storage device, at 402, and stored directly to a cache, such as the media cache 110 shown in FIG. 1, of the data storage device, at 404. The data received may be preferred by the host to be stored in a specific cache or memory store that is a different memory location or memory device than where the data was stored, such as by indicating a specific LBA to store the data to. In some instances, any of the non-volatile caches and the main store may include addressable LBA ranges and may be the preferred target of the received data. However, the method 400, at 404, may ignore any request to store the data to the specific LBAs and instead store the data to another memory location. In an embodiment, data may be received and a determination made to store the data preferably in one particular cache, but the data may be initially stored in a different cache or even in the main store. For example, by utilizing an initial cache, host data that may be intended for Flash memory may be efficiently and rapidly cached and later moved to the Flash, or other intended LBA, when time is less critical.

The method 400 also includes the data storage device determining if the data stored at the initial cache is preferably to be stored at a different memory location, at 406. If the data is stored in the preferable location, then the method ends, at 408. If the data is preferably stored at another location, the method 400 determines if the data storage device has resources available (available time and data transfer capability) to move the data to the preferred storage location, at 410. If the resources are available, the data storage device can move the data to the preferred storage location, at 412. If the resources are not available, the data storage device may monitor the resources and move the data to the preferred storage location when the resources become available, at 412.

Figure 5:
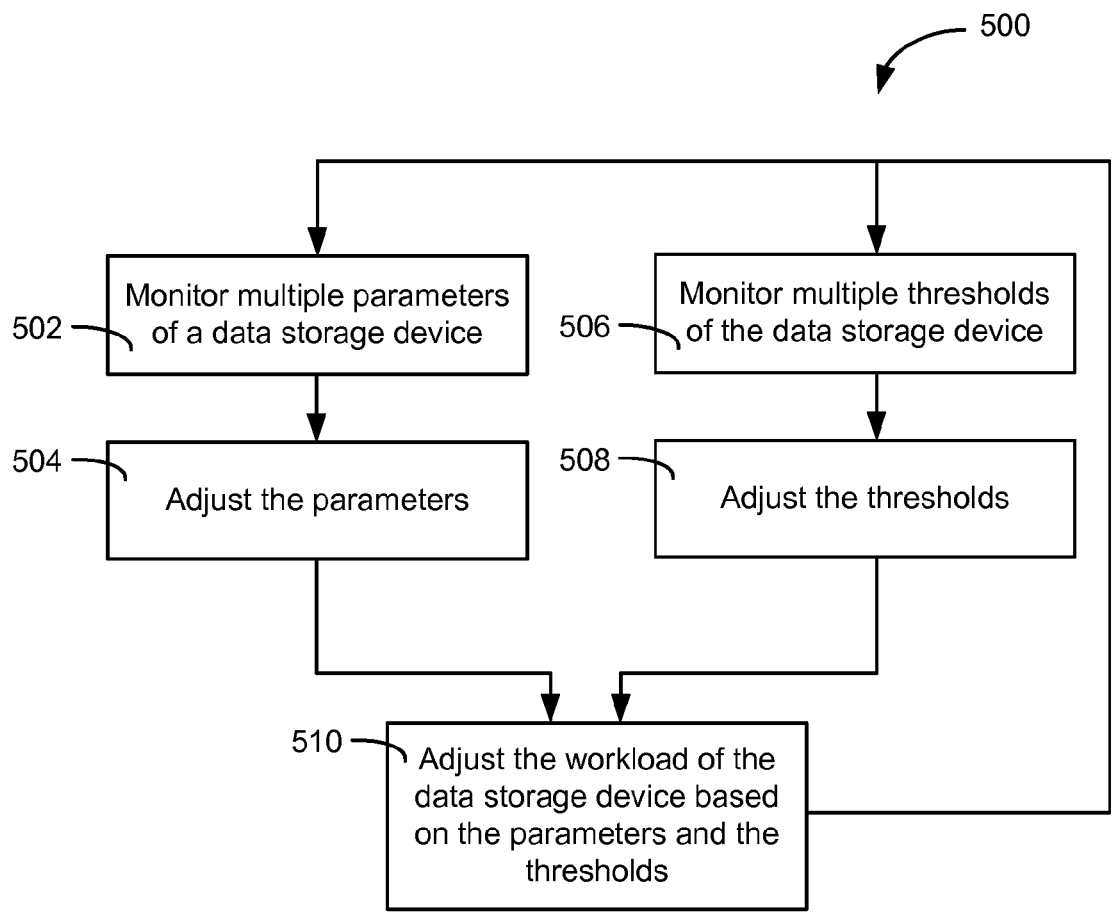
FIG. 5 is a flow diagram of another embodiment of a method of dynamic data flow management in an architecture with multiple caches.

Referring to FIG. 5, a flow diagram of another embodiment of a method of dynamic dataflow management in a multiple cache architecture is depicted and generally designated 500. The method 500 may be performed by a data storage device, such as the data storage device 100 shown in FIG. 1, in real-time. The data storage device may implement the method 500 to dynamically adapt to workloads, such as to optimize performance or reduce wear.

The method 500 may include monitoring multiple parameters of the data storage device, at 502. These parameters may include: a current flash hit rate; a moving average of the hit rate for the previous 10, 100, and 1000 data transfers; a write hit rate in the non-volatile cache; a moving average of the write hit rate for the last 10, 100, and 1000 writes; a percentage of flash memory currently unavailable for writing; a total flash write count; a read count and/or a write count for specific sections of the flash; a last read time and last write time for each of the specific sections of the flash; a number of input/output operations per second (IOPS) coming to/from the data storage device; an average response time; and a ratio of reads to writes.

The data storage device may then adjust one or more of the parameters, at 504. The adjusted parameters may be used for key decision points in the operation of the multiple cache architecture storage device. These decision points may include:

1) when data stored in flash must be moved in order to create a new erasure block in the flash memory;
2) when to make new clean erasure blocks for future use;
3) which erasure block to erase next;
4) where to put write data when it has to be moved from a non-volatile cache;
5) when to promote data from disc storage to Flash storage;
6) what data to keep in the non-volatile cache; and
7) what to do with read data in a volatile cache, such as DRAM, when it needs to be moved.

These decision points may be determined based on an adaptable set of parameters that have weights that may be continually adjusted during operation of the data storage device.

The parameter weights may include the following:
Wrc=weight for read count of data block;
Wwc=weight for write count of data block;
Wrt=weight for last time data block was read;
Wwt=weight for last time data block was written;
Wip=weight for number of invalid pages in erasure block;
Wrce=weight for read count of erasure block (number of times erase block has been read);

Wwtn=weight for last time for non-volatile cache stay decision;

Wwcn=weight for write count for non-volatile cache stay decision;

The parameter weights can be used to calculate values to compare to thresholds related to the decision points. The following values can be calculated from the parameter weights:

DataValue=Wrc*ReadCount+Wwc*WriteCount+ Wrt*TimeRead+Wwt*TimeWritten

EraseBlockValue=Wip*InvalidPages+ Wrce*EB_EraseCount

NVCacheValue=Wwtn*TimeWritten+ Wwcn*WriteCount

A set of thresholds may also be continually measured, at 506, and adjusted, at 508, by the data storage device to find optimum settings. The data storage device may compare the calculated values to the thresholds to make decisions based on the decision points. The thresholds may include:

T1=the threshold for decision point 1. If the value (Data-Value) of a particular block is above the threshold, the data will be kept in flash, below this value the data will be moved to the disc.

T2=the threshold for decision point 2. T2 is an amount of erasure blocks to be maintained per flash device. Each flash device must maintain a certain amount of erasure blocks free for future writes. The methods may move data from one erasure block to another erasure block to make sure a specific erasure block within a memory does not have any data stored therein.

T4=Data Value the threshold for decision point 4. If the data block value (DataValue) is above this value, it will be moved to flash, if below this value it will be moved to the disc.

T5=Threshold for decision point 5. If the data block value (DataValue) is above this threshold, it will be kept in NV Cache. Below this value it will be moved.

T6=Threshold for decision point 6. If the data block write value (NVCacheValue) is above this threshold, it will be kept in non-volatile cache. If the NVCacheValue is below this threshold, the data will be moved.

T7=Threshold for decision point 7. If the data block value (DataValue) is above this value the data will be moved from volatile memory, such as the DRAM, to non-volatile memory, such as the Flash memory.

Decision point 3 does not have an associated threshold. The decision on which erasure block to erase next may be based on a number of invalid blocks and a read count of the erasure block. An erasure block with the highest score (EraseBlockValue) can be selected as the next one to erase.

In addition, an amount of read look ahead data (ARLA) to acquire when a cache miss occurs may be continually adapted.

In a particular embodiment, all eight tunable weight parameters, six tunable thresholds, and the ARLA may be continually updated to optimize workload of a data storage device, at 510. These attributes may be used to select a particular data flow scheme. In other embodiments, more or less tunable parameters and thresholds may be implemented.

Figure 6:
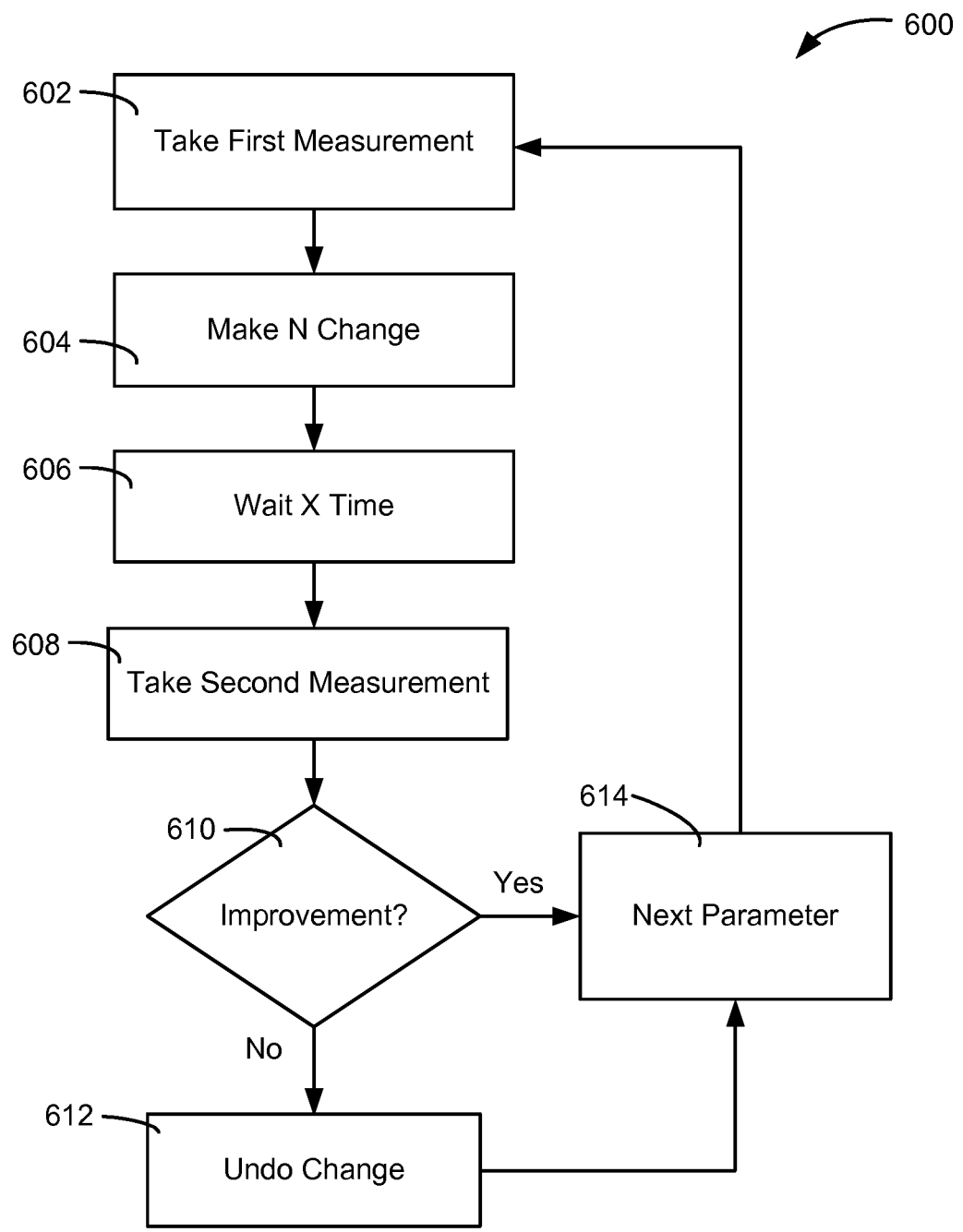
FIG. 6 is a flow diagram of another embodiment of a method of dynamic data flow management in an architecture with multiple caches.

Referring to FIG. 6, a flow diagram of another embodiment of a method of dynamic data flow management in a multiple cache architecture is shown and generally designated 600. The method 600 may be used to test the parameters described above. For example, each of the parameters may be continuously varied and tested via the method 600.

To test a parameter, a first measurement relevant to the parameter may be taken, at 602. The method 600 may then adjust the parameter by making a change of an amount "N", at 604; N may be an addition or subtraction from the first measurement. The method 600 may then wait an amount of time "X", at 606. After the amount of time X has expired, the method 600 may take a second measurement relevant to the parameter, at 608.

Once the second measurement is taken, the method may determine if there is an improvement, at 610. The weights Wrc, Wwc, Wrt, Wwt, Wip, and Wrce may use flash hit rates to measure how good they are and whether there is an improvement. Generally, the higher the flash hit rate, the better the weights are. The weights Wwtn and Wwcn may use a write hit count (which may be a count of rewrite of data found in cache) to measure how good they are and whether there is an improvement. Generally, the higher the write hit count, the better the weights are. In addition to the weights, the thresholds may also be evaluated. The thresholds T1, T4, T5, and T7 may be evaluated using flash hit rates, where higher hit rates indicate better thresholds.

If there is an improvement, at 610, then the method 600 proceeds to select and test a next parameter, at 614. If there is not an improvement, then the method 600 undoes the changes made to the parameter, at 612, and then proceeds to select a next parameter to test, at 614.

How often the method 600 occurs may increase as performance of a storage device decreases and may decrease as performance of the storage device increases. In addition, the size of the change N may also be inversely proportional to the current performance; that is N may increase as performance decreases and N may decrease as performance increases.

In accordance with various embodiments, the methods described herein may be implemented as one or more software programs running on a computer processor or controller, such as the controller 105 or the controller 206. The methods described herein may be implemented completely within a storage device controller within a data storage device. Dedicated hardware implementations including, but not limited to, application specific integrated circuits, programmable logic arrays and other hardware devices can likewise be constructed to implement the methods described herein.

Even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles discussed herein. The illustrations are not intended to serve as a complete description of all of the elements and features of apparatus and systems that utilize the structures or methods described herein. Many other embodiments may be apparent to those of skill in the art upon reviewing the disclosure. For example, the particular elements may vary depending on the particular application for the data storage system while maintaining substantially the same functionality without departing from the scope and spirit of the present disclosure. In addition, although an embodiment described herein is directed to a hybrid data storage system including a disc data storage medium and at least one non-volatile solid-state data storage medium, it will be appreciated by those skilled in the art that the teachings of the present application can be applied to solid-state data storage devices having only solid-state data storage media and other types or combinations of data storage media.

What is claimed is:

1. A method comprising:
   detecting multiple attributes of a system having a data storage device with at least two memories of different types;
   selecting at least one of a plurality of data flow schemes based on the multiple attributes, wherein a data flow scheme defines a particular data path to transfer data from one memory to another; and
   implementing the at least one of a plurality of data flow schemes within the data storage device;
   wherein the multiple attributes comprise a read count for each data block, a write count for each data block, a last time a data block was read, a last time a data block was written, and a number of invalid pages in an erasure block.

2. The method of claim 1, further comprising selecting the at least one of a plurality of data flow schemes in real-time during use of the data storage device.

3. The method of claim 1, wherein the plurality of data flow schemes further comprise:
   a first data flow scheme for storing data according to a first order of storing data to the at least two memories; and
   a second data flow scheme for storing data according to a second order of storing data to the at least two memories;
   wherein the first order of storing data and the second order of storing data are different.

4. The method of claim 1, wherein the multiple attributes are used to calculate a decision value to compare to a threshold, and the selecting the at least one of the plurality of data flow schemes is based on the comparison of the decision value to the threshold.

5. The method of claim 4, wherein the multiple attributes are continually measured by the data storage device and the threshold is adjusted based on the continuous monitoring.

6. The method of claim 1, wherein the data storage device comprises:
   a first memory comprising a volatile solid state memory;
   a second memory comprising a non-volatile solid state memory; and
   a data storage controller coupled to the first memory and the second memory,
   wherein the method is executed by the data storage controller and completely within the data storage device.

7. An apparatus comprising:
   a data storage device including:
   a first memory;
   a second memory, wherein the second memory is a different type of memory than the first memory;
   a third memory, wherein the third memory is a different type than the first memory and the third memory is a different type than the second memory
   an interface adapted to couple the data storage device to a host computer and receive commands and data from the host computer;
   logic coupled to the interface and configured to:
      detect multiple attributes of the apparatus;
      select at least one data flow scheme from a plurality of data flow schemes based on the multiple attributes, where a data flow scheme defines a particular data path to transfer data between multiple memories of different types within the data storage device; and
      implement the selected data flow scheme;
   wherein the multiple attributes comprise a read count for each data block, a write count for each data block, a last time a data block was read, a last time a data block was written, and a number of invalid pages in an erasure block.

8. The apparatus of claim 7, wherein the third memory comprises a volatile solid state memory, the second memory comprises a non-volatile solid state memory, the first memory comprises a magnetic disc.

9. The apparatus of claim 7, further comprising the logic configured to calculate a decision value base on at least one of the multiple attributes to compare to a threshold, and the selecting the at least one of the plurality of data flow schemes is based on the comparison of the decision value to the threshold.

10. The apparatus of claim 9, wherein a selected data flow scheme comprises moving data stored in the first memory, which comprises a non-volatile solid state memory, to make sure a specific erasure block within the first memory does not have any data stored therein.

11. The apparatus of claim 9, wherein a selected data flow scheme comprises moving data from the second memory, which comprises a volatile solid state memory, to the first memory, which comprises a non-volatile memory.

12. A computer readable storage device storing instructions, that when executed cause a processor to perform a method comprising:
   detecting multiple attributes of a system having a data storage device with at least two memories of different types;
   selecting at least one of a plurality of data flow schemes based on the multiple attributes, wherein a data flow scheme defines an order of transferring data between the at least two memories; and
   implementing the at least one of a plurality of data flow schemes within the data storage device;
   wherein the multiple attributes comprise a read count for each data block, a write count for each data block, a last time a data block was read, a last time a data block was written, and a number of invalid pages in an erasure block.

13. The computer readable storage device of claim 12, further comprising instructions to cause the processor to execute the method further comprising:
   selecting a first data flow scheme for storing data according to a first priority of storing data to the at least two memories when a first attribute is detected; and
   selecting a second data flow scheme for storing data according to a second priority of storing data to the at least two memories when a second attribute is detected.

14. The computer readable storage device of claim 12, further comprising instructions to cause the processor to execute the method further comprising:
   calculate a decision value base on at least one of the multiple attributes;
   comparing the decision value to a threshold; and
   selecting the at least one of the plurality of data flow schemes based on the comparison of the decision value to the threshold.

15. The computer readable storage device of claim 12, wherein the decision value is calculated using more than one of the multiple attributes.

* * * * *